US009251623B2

(12) United States Patent
Kirk (10) Patent No.: US 9,251,623 B2
(45) Date of Patent: Feb. 2, 2016

(54) GLANCING ANGLE EXCLUSION

(75) Inventor: Adam G. Kirk, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 611 days.

(21) Appl. No.: 13/599,436

(22) Filed: Aug. 30, 2012

(65) Prior Publication Data

US 2013/0321590 A1    Dec. 5, 2013

Related U.S. Application Data (60) Provisional application No. 61/653,983, filed on May 31, 2012.

(51) Int. Cl.
*G06T 17/00* (2006.01)
*G06T 15/04* (2011.01)

(52) U.S. Cl.
CPC .............. *G06T 17/00* (2013.01); *G06T 15/04* (2013.01); *G06T 2210/56* (2013.01)

(58) Field of Classification Search
USPC ............................. 345/419; 382/154; 348/48
See application file for complete search history.

(56) References Cited

U.S. PATENT DOCUMENTS

| | | | |
|---|---|---|---|
| 5,850,352 A | 12/1998 | Moezzi et al. | |
| 5,926,400 A | 7/1999 | Kytle et al. | |
| 6,072,496 A | 6/2000 | Guenter | |
| 6,226,003 B1 | 5/2001 | Akeley | |
| 6,327,381 B1 | 12/2001 | Rogina et al. | |
| 6,496,601 B1 | 12/2002 | Migdal | |
| 6,509,902 B1 | 1/2003 | Pfister et al. | |
| 6,556,199 B1 | 4/2003 | Fang et al. | |
| 6,750,873 B1 | 6/2004 | Bernardini et al. | |
| 6,781,591 B2 | 8/2004 | Raskar | |
| 6,968,299 B1 | 11/2005 | Bernardini et al. | |
| 7,023,432 B2 | 4/2006 | Fletcher | |
| 7,096,428 B2 | 8/2006 | Foote | |
| 7,106,358 B2 | 9/2006 | Valliath | |
| 7,142,209 B2 | 11/2006 | Uyttendaele | |
| 7,286,143 B2 | 10/2007 | Kang | |
| 7,348,976 B2 | 3/2008 | Mori | |
| 7,551,232 B2 | 6/2009 | Winger | |
| D610,105 S | 2/2010 | Graham | |
| 7,671,893 B2 | 3/2010 | Li | |
| 7,702,016 B2 | 4/2010 | Winder | |
| 7,778,491 B2 | 8/2010 | Steedly | |
| 7,840,638 B2 | 11/2010 | Zhang | |
| 8,036,491 B2 | 10/2011 | Matsui | |
| 8,106,924 B2 | 1/2012 | Aliprandi et al. | |

(Continued)

OTHER PUBLICATIONS

Miller "High Quality Novel View Rendering from Multiple Cameras", 2007.*

(Continued)

*Primary Examiner* — Kimbinh T Nguyen
(74) *Attorney, Agent, or Firm* — Cassandra T. Swain; Danielle Johnston Holmes; Micky Minhas (57) ABSTRACT

The glancing angle exclusion technique described herein selectively limits projective texturing near depth map discontinuities. A depth discontinuity is defined by a jump between a near-depth surface and a far-depth surface. The claimed technique can limit projective texturing on near and far surfaces to a different degree—for example, the technique can limit far-depth projective texturing within a certain distance to a depth discontinuity but not near-depth projective texturing.

20 Claims, 6 Drawing Sheets

(56) References Cited

U.S. PATENT DOCUMENTS

| | | | |
|---|---|---|---|
| 8,156,239 B1 | 4/2012 | Ashrafi | |
| 8,411,126 B2 | 4/2013 | Lee et al. | |
| 8,441,482 B2 | 5/2013 | Ozdac et al. | |
| 2002/0186216 A1 | 12/2002 | Baumberg et al. | |
| 2002/0196256 A1 | 12/2002 | Hoope | |
| 2003/0038892 A1 | 2/2003 | Wang et al. | |
| 2003/0085992 A1 | 5/2003 | Arpa et al. | |
| 2003/0218672 A1 | 11/2003 | Zhang | |
| 2004/0044441 A1 | 3/2004 | Gupta et al. | |
| 2004/0217956 A1 | 11/2004 | Besl et al. | |
| 2005/0001832 A1 | 1/2005 | Shen et al. | |
| 2005/0013465 A1 | 1/2005 | Southall et al. | |
| 2005/0017969 A1* | 1/2005 | Sen et al. | 345/419 |
| 2005/0052452 A1 | 3/2005 | Baumberg | |
| 2005/0075167 A1 | 4/2005 | Beaulieu et al. | |
| 2005/0280646 A1 | 12/2005 | Wang | |
| 2005/0285875 A1 | 12/2005 | Kang | |
| 2005/0286759 A1 | 12/2005 | Zitnick et al. | |
| 2006/0023782 A1 | 2/2006 | Cai | |
| 2006/0028473 A1 | 2/2006 | Uyttendaele | |
| 2006/0028489 A1 | 2/2006 | Uyttendaele | |
| 2006/0158509 A1 | 7/2006 | Kenoyer | |
| 2006/0221072 A1 | 10/2006 | Se | |
| 2006/0262856 A1 | 11/2006 | Wu | |
| 2006/0267977 A1 | 11/2006 | Barfuss et al. | |
| 2006/0290695 A1 | 12/2006 | Salomie | |
| 2007/0070177 A1 | 3/2007 | Christensen | |
| 2007/0236656 A1 | 10/2007 | Jeong | |
| 2007/0237420 A1 | 10/2007 | Steedly et al. | |
| 2007/0263080 A1 | 11/2007 | Harrell | |
| 2008/0043024 A1 | 2/2008 | Schiwietz et al. | |
| 2008/0088626 A1 | 4/2008 | Habe | |
| 2008/0095465 A1 | 4/2008 | Mullick et al. | |
| 2008/0298571 A1 | 12/2008 | Kurtz et al. | |
| 2009/0016641 A1 | 1/2009 | Paladini et al. | |
| 2009/0033740 A1 | 2/2009 | Ishikawa | |
| 2009/0109280 A1 | 4/2009 | Gotsman et al. | |
| 2009/0128548 A1 | 5/2009 | Gloudemans | |
| 2009/0128568 A1 | 5/2009 | Gloudemans et al. | |
| 2009/0215533 A1 | 8/2009 | Zalewski et al. | |
| 2009/0290811 A1 | 11/2009 | Imai | |
| 2009/0315978 A1 | 12/2009 | Wurmlin et al. | |
| 2010/0026712 A1 | 2/2010 | Aliprandi | |
| 2010/0080448 A1 | 4/2010 | Tam | |
| 2010/0142824 A1* | 6/2010 | Lu | 382/195 |
| 2010/0158388 A1 | 6/2010 | Bookout | |
| 2010/0201681 A1 | 8/2010 | Criminisi | |
| 2010/0225735 A1 | 9/2010 | Shaffer | |
| 2010/0254627 A1 | 10/2010 | Panahpour Tehrani et al. | |
| 2010/0259595 A1 | 10/2010 | Trimeche | |
| 2010/0262628 A1 | 10/2010 | Singer | |
| 2010/0265248 A1 | 10/2010 | McCrae | |
| 2010/0303303 A1 | 12/2010 | Shen et al. | |
| 2010/0321378 A1 | 12/2010 | Betzler | |
| 2010/0328437 A1 | 12/2010 | Lee | |
| 2010/0328475 A1 | 12/2010 | Thomas | |
| 2010/0329358 A1 | 12/2010 | Zhang | |
| 2011/0032251 A1 | 2/2011 | Pothana | |
| 2011/0050859 A1 | 3/2011 | Kimmel | |
| 2011/0058021 A1 | 3/2011 | Chen | |
| 2011/0084983 A1 | 4/2011 | Demaine | |
| 2011/0093273 A1 | 4/2011 | Lee | |
| 2011/0096832 A1 | 4/2011 | Zhang | |
| 2011/0122225 A1 | 5/2011 | Kim et al. | |
| 2011/0142321 A1 | 6/2011 | Huffman | |
| 2011/0169824 A1 | 7/2011 | Fujinami | |
| 2011/0181685 A1 | 7/2011 | Saleh | |
| 2011/0211749 A1 | 9/2011 | Tan | |
| 2011/0252320 A1 | 10/2011 | Arrasvuori et al. | |
| 2011/0261050 A1* | 10/2011 | Smolic et al. | 345/419 |
| 2011/0267344 A1* | 11/2011 | Germann et al. | 345/420 |
| 2011/0304619 A1 | 12/2011 | Fu et al. | |
| 2012/0075303 A1 | 3/2012 | Johnsson | |
| 2012/0114039 A1 | 5/2012 | Wang | |
| 2012/0127267 A1 | 5/2012 | Zhang et al. | |
| 2012/0141016 A1 | 6/2012 | Wildeboer et al. | |
| 2012/0155680 A1 | 6/2012 | Chen et al. | |
| 2013/0039632 A1 | 2/2013 | Feinson | |
| 2013/0257853 A1 | 10/2013 | Schmidt | |
| 2013/0286204 A1 | 10/2013 | Cheng | |
| 2014/0219550 A1* | 8/2014 | Popa et al. | 382/154 |

OTHER PUBLICATIONS

Luat Do Quality improving techniques for Free-Viewpoint DIBR, 2010.*
Zinger et al. "Free-Viewpoint depth image based rendering", 2009.*
Vooke et al. "Multilple image view synthesis fro free viewpoint video applications", 2005.*
Chang et al., Principal Component Analysis-based Mesh Decomposition, J. Inf. Sci. Eng., May 2009, vol. 25, No. 4, pp. 971-987.
Kalvin et al., Superfaces: Polygonal Mesh Simplification with Bounded Error, J. IEEE Comp. Graphics and Applications, May 1996, vol. 16, No. 3, pp. 64-77.
Kanade et al., Virtualized Reality: Constructing Virtual Worlds from Real Scenes, IEEE Multimedia, Immersive Telepresence, Jan. 1997, vol. 4, No. 1, pp. 34-47.
Morvan, Y., C. O'Sullivan, Visual Tuning of an Image-Based Rendering Algorithm, Proc. of Eurographics, Oct. 2006, pp. 1-6, Ireland, Dublin.
Newcombe et al., Live Dense Reconstruction with a Single Moving Camera, The Twenty-Third IEEE Conf. on Comp. Vision and Pattern Recognition, CVPR 2010, Jun. 2010, pp. 1498-1505, San Francisco, CA, USA.
Rus et al., Analysing the Influence of Vertex Clustering on PCA-Based Dynamic Mesh Compression, Proc. of the 6th Int'l Conf. on Articulated Motion and Deformable Objects, AMDO 2010, Jul. 2010, pp. 55-66, Port d'Andratx, Mallorca, Spain.
Rusinkiewicz et al., Qsplat: A Multiresolution Point Rendering System for Large Meshes, Proc. of the 27th Annual Conf. on Comp. Graphics, SIGGRAPH 2000, Jul. 23-28, 2000, pp. 343-352, New Orleans, Louisiana, USA.
Wikipedia, K-d-tree.pdf, May 2, 2012, p. 1.
Yang, Yi, U.S. Office Action, U.S. Appl. No. 13/566,796, Apr. 18, 2014, pp. 1-13.
Wills, Diane M., U.S. Office Action, U.S. Appl. No. 13/599,263, May 29, 2014, pp. 1-19.
Mamou, K. et al., A simple and efficient approach for 3D mesh approximate convex decomposition, 16th Int'l Conf. on Image Processing, ICIP, Nov. 2009, pp. 3501-3504, Cairo, Egypt.
Wills, Diane M., U.S. Notice of Allowance, U.S. Appl. No. 13/599,263, Aug. 21, 2014, pp. 1-7.
Cooper, O. D., Robust generation of 3D models from video footage of urban scenes, Ph.D Thesis, University of Bristol, Mar. 2005.
Gautier, J., E. Bosc, L. Morin, Representation and coding of 3D video data, Nov. 17, 2010, pp. 1-43.
Goldlücke, B., Multi-camera reconstruction and rendering for free-viewpoint video, Ph.D. Thesis, Nov. 29, 2006, pp. 1-164, Max-Planck-Institut für Informatik.
Li, W., Free viewpoint video with image-based rendering, Ph.D Dissertation, May 2010, pp. 1-151, Arizona State University.
Pollefeys, M., D. Nistér, J.-M. Frahm, A. Akbarzadeh, P. Mordohai, B. Clipp, C. Engels, D. Gallup, S. J. Kim, P. Merrell, C. Salmi, S. N. Sinha, B. Talton, L. Wang, Q. Yang, H. Stewénius, R. Yang, G. Welch, H. Towles, Detailed real-time urban 3D reconstruction from video, Int'l J. of Comp. Vision, Jul. 2008, pp. 143-167, vol. 78, No. 2-3.
Sugden, B., M. Iwanicki, Mega meshes: Modelling, rendering and lighting a world made of 100 billion polygons, Game Developers Conf., Feb. 28-Mar. 4, 2011, pp. 1-67, San Francisco, CA.
Aliaga, D. G., I. Carlbom, A spatial image hierarchy for compression in image-based-rendering, Proc. of the 2005 Int'l Conf. on Image Processing, ICIP 2005, Sep. 11-14, 2005, pp. 609-612, vol. 1, Genoa, Italy.
Arsenault, R., C. Ware, Frustum view angle, observer view angle and VE navigation, Proc. of the 5th Symposium on Virtual Reality, Oct. 7-10, 2002, Fortaleza, CE, Brazil.
Berger, K, K. Ruhl, Y. Schroeder, C. Bruemmer, A. Scholz, M. A. Magnor, Markerless motion capture using multiple color-depth sen- (56) References Cited

OTHER PUBLICATIONS sors, Proc. of the Vision, Modeling, and Visualization Workshop 2011, VMV 2011, Oct. 4-6, 2011, pp. 317-324, Berlin, Germany.
Bogomjakov, A., C. Gotsmann, M. Magnor, Free-viewpoint video from depth cameras, Proc. Vision, Modeling and Visualization, Nov. 2006, pp. 89-96.
Boukerche, A., R. Jarrar, R. W. Pazzi, A novel interactive streaming protocol for image-based 3D virtual environment navigation, Proc. of IEEE Int'l Conf. on Communications, ICC 2009, Jun. 14-18, 2009, pp. 1-6, Dresden, Germany.
Carranza, J., C. Theobalt, M. A. Magnor, H.-P. Seidel, Free-viewpoint video of human actors, ACM Trans. Graph., Jul. 2003, pp. 569-577, vol. 22, No. 3.
Deering, M., Geometry compression, Proc. of the 22nd Annual Conf. on Comp. Graphics and Interactive Techniques, SIGGRAPH 1995, Aug. 6-11, 1995, pp. 13-20, Los Angeles, CA, USA.
Do, L., S. Zinger, P.H.N. de With, Quality improving techniques for free-viewpoint DIBR, 3DTV-Conference: The True Vision Capture, Transmission and Display of 3D Video, May 4-6, 2009, pp. 1-4, Potsdam, Germany.
Eisemann, M., F. Klose, M. A. Magnor, Towards plenoptic Raumzeit reconstruction, Video Processing and Computational Video—International Seminar, Oct. 10-15, 2010, pp. 1-24, Dagstuhl Castle, Germany.
Eisert, P., Virtual video conferencing using 3D model-assisted image-based rendering, The 2nd IEE European Conf. on Visual Media Production, CVMP 2005, Nov. 30-Dec. 1, 2005, pp. 185-193.
Ekmekcioglu, E., B. Gunel, M. Dissanayake, S. T. Worrall, A. M. Kondoz, A scalable multi-view audiovisual entertainment framework with content-aware distribution, 17th IEEE Int'l Conf. on Image Processing, ICIP 2010, Sep. 26-29, 2010, pp. 2401-2404, Hong Kong.
Fitzgibbon, A. W., Y. Wexler, A. Zisserman, Image-based rendering using image-based priors, 9th IEEE Int'l Conf. on Comp. Vision, ICCV 2003, Oct. 14-17, 2003, pp. 1176-1183, Nice, France.
Grau, O., Multi-view 4D reconstruction of human action for entertainment applications, Research and Development White Paper, British Broadcasting Company, Nov. 2011, pp. 1-21.
Guillemaut, J.-Y., A. Hilton, Joint multi-layer segmentation and reconstruction for free-viewpoint video applications, Int'l J. of Comp. Vision, May 2011, pp. 73-100, vol. 93, No. 1.
Hornung, A., L. Kobbelt, Interactive pixel-accurate free viewpoint rendering from images with silhouette aware sampling, Comput. Graph. Forum, Dec. 2009, pp. 2090-2103, vol. 28, No. 8.
Kilner, J., J. Starck, A. Hilton, A comparative study of free-viewpoint video techniques for sports events, European Conf. on Visual Media Production, Nov. 29-30, 2006, pp. 87-96.
Kim, Y. M., D. Chan, C. Theobalt, S. Thrun, Design and calibration of a multi-view TOF sensor fusion system, IEEE Comp. Society Conf. on Comp. Vision and Pattern Recognition Workshops, CVPRW 2008, Jun. 23-28, 2008, pp. 1-7.
Kurashima, C. S., R. Yang, A. Lastra, Combining approximate geometry with view-dependent texture mapping—A hybrid approach to 3D video teleconferencing, 15th Brazilian Symposium on Comp. Graphics and Image Processing, SIBGRAPI 2002, Oct. 7-10, 2002, pp. 112-119, Fortaleza-CE, Brazil.
Kuster, C., T. Popa, C. Zach, C. Gotsman, M. H. Gross, FreeCam: A hybrid camera system for interactive free-viewpoint video, Proc. of the Vision, Modeling, and Visualization Workshop 2011, VMV 2011, Oct. 4-6, 2011, pp. 17-24, Berlin, Germany.
Lai, K.-K., Y.-L. Chan, C.-H. Fu, W.-C. Siu, Viewpoint switching in multiview videos using SP-frames, Proc. of the Int'l Conf. on Image Processing, ICIP 2008, Oct. 12-15, 2008, pp. 1776-1779, San Diego, California, USA.
Lamboray, E., S. Würmlin, M. Waschbüsch, M. H. Gross, H. Pfister, Unconstrained free-viewpoint video coding, Proc. of the 2004 Int'l Conf. on Image Processing, ICIP 2004, Oct. 24-27, 2004, pp. 3261-3264, Singapore.
Lei, C., Y.-H. Yang, Efficient geometric, photometric, and temporal calibration of an array of unsynchronized video cameras, Sixth Canadian Conf. on Comp. and Robot Vision, CRV 2009, May 25-27, 2009, pp. 162-169, Kelowna, British Columbia, Canada.
Lipski, C., C. Linz, K. Berger, A. Sellent, M. A. Magnor, Virtual video camera: Image-based viewpoint navigation through space and time, Comput. Graph. Forum, Dec. 2010, pp. 2555-2568, vol. 29, No. 8.
Liu, Y., Q. Dai, W. Xu, A point-cloud-based multiview stereo algorithm for free-viewpoint video, IEEE Trans. Vis. Comput. Graph., May/Jun. 2010, pp. 407-418, vol. 16, No. 3.
Liu, S., K. Kang, J.-P. Tarel, D. B. Cooper, Free-form object reconstruction from silhouettes, occluding edges and texture edges: A unified and robust operator based on duality, IEEE Trans. Pattern Anal. Mach. Intell., Jan. 2008, pp. 131-146, vol. 30, No. 1.
Lu, Z., Y.-W. Tai, M. Ben-Ezra, M. S. Brown, A framework for ultra high resolution 3D imaging, The Twenty-Third IEEE Conf. on Comp. Vision and Pattern Recognition, CVPR 2010, Jun. 13-18, 2010, pp. 1205-1212, San Francisco, CA, USA.
Morvan, Y., D. Farin, P. De With, System architecture for free-viewpoint video and 3D-TV, IEEE Transactions on Consumer Electronics, May 2008, pp. 925-932, vol. 54, No. 2.
Nabeshima, R., M. Ueda, D. Arita, R. Taniguchi, Frame rate stabilization by variable resolution shape reconstruction for on-line free-viewpoint video generation, Proc. of the 7th Asian Conf. on Comp. Vision, Jan. 13-16, 2006, pp. 81-90, Hyderabad, India.
Piatti, D., Time-of-flight cameras: Tests, calibration and multi-frame registration for automatic 3D object reconstruction, 2011, pp. 1-10.
Shi, S., W. J. Jeon, K. Nahrstedt, R. H. Campbell, Real-time remote rendering of 3D video for mobile devices, Proc. of the 17th Int'l Conf. on Multimedia 2009, ACM Multimedia 2009, Oct. 19-24, 2009, pp. 391-400, Vancouver, British Columbia, Canada.
Smolić, A., K. Muller, P. Merkle, T. Rein, M. Kautzner, P. Eisert, T. Wiegand, Free viewpoint video extraction, representation, coding, and rendering, Proc. of the 2004 Int'l Conf. on Image Processing, ICIP 2004, Oct. 24-27, 2004, pp. 3287-3290, vol. 5, Singapore.
Smolić, A., P. Kauff, Interactive 3D video representation and coding technologies, Invited Paper, Proc. of the IEEE, Special Issue on Advances in Video Coding and Delivery, Jan. 2005, pp. 98-110, vol. 93, No. 1.
Starck, J., J. Kilner, A. Hilton, A free-viewpoint video renderer, J. Graphics, GPU, & Game Tools, 2009, pp. 57-72, vol. 14, No. 3.
Kilner, J., J. Starck, J.-Y. Guillemaut, A. Hilton, Objective quality assessment in free-viewpoint video production, Sig. Proc.: Image Comm., Jan. 2009, pp. 3-16, vol. 24, No. 1-2.
Starck, J., J. Kilner, A. Hilton, Objective quality assessment in free-viewpoint video production, 3DTV Conf.: The True Vision—Capture, Transmisson and Display of 3D Video, May 28-30, 2008, pp. 225-228, Istanbul, Turkey.
Theobalt, C., M. Li, M. A. Magnor, H.-P. Seidel, A flexible and versatile studio for synchronized multi-view video recording, Vision, Video, and Graphics, VVG 2003, Jul. 10-11, 2003, pp. 9-16, University of Bath, UK.
Tian, D. P.-L. Lai, P. Lopez, C. Gomila, View synthesis techniques for 3D video, Proc. of the SPIE Applications of Digital Image Processing XXXII, Sep. 2009, pp. 74430T-74430T-11, vol. 7443.
Vertegaal, R., I. Weevers, C. Sohn, C. Cheung, Gaze-2: Conveying eye contact in group video conferencing using eye-controlled camera direction, Proc. of the 2003 Conf. on Human Factors in Computing Systems, CHI 2003, Apr. 5-10, 2003, pp. 521-528, Ft. Lauderdale, Florida, USA.
Wei, X., L. Yin, Z. Zhu, Q. Ji, Avatar-mediated face tracking and lip reading for human computer interaction, Proc. of the 12th ACM Int'l Conf. on Multimedia, ACM Multimedia 2004, Oct. 10-16, 2004, pp. 500-503, New York, NY, USA.
Wikipedia, Hidden surface determination, Apr. 23, 2012, pp. 1-4.
Würmlin, S., E. Lamboray, M. Waschbüsch, M. Gross, Dynamic point samples for free-viewpoint video, Proc. of the Picture Coding Symposium, Dec. 15-17, 2004, pp. 6, San Francisco, CA.
Würmlin, S., E. Lamboray, M. Waschbüsch, P. Kaufman, A. Smolić, M. Gross, Image-space free-viewpoint video, Vision, Modeling, and Visualization, VMV 2005, Nov. 16-18, 2005, pp. 453-460, Erlangen, Germany.
Yea, S., A. Vetro, View synthesis prediction for multiview video coding, Sig. Proc.: Image Comm., Jan. 2009, pp. 89-100, vol. 24, No. 1-2.

(56) References Cited

OTHER PUBLICATIONS

Yea, S., A. Vetro, View synthesis prediction for rate-overhead reduction in FTV, 3DTV Conf.: The True Vision—Capture, Transmission and Display of 3D Video, May 28-30, 2008, pp. 145-148, Istanbul, Turkey.

Zhu, Y., A novel view multi-view synthesis approach for free viewpoint video, Int'l Joint Conf. on Artificial Intelligence, JCAI '09, Apr. 25-26, 2009, pp. 88-91, Hainan Island, China.

Ziegler, G., H. P. A. Lensch, M. Magnor, H.-P. Seidel, Multi-video compression in texture space using 4D SPIHT, 2004 IEEE 6th Workshop on Multimedia Signal Processing, Sep. 29-Oct. 1, 2004, pp. 39-42, MPI Informatik, Saarbrucken, Germany.

Zitnick, C. L., S. B. Kang, M. Uyttendaele, S. A. J. Winder, R. Szeliski, High-quality video view interpolation using a layered representation, ACM Trans. Graph., Aug. 2004, pp. 600-608, vol. 23, No. 3.

Li, et al., "Joint View Filtering for Multiview Depth Map Sequences", In 19th IEEE International Conference on Image Processing, Sep. 30, 2012, pp. 1329-1332.

Morvan, et al., "Multiview Depth-Image Compression Using an Extended H.264 Encoder", In Advanced Concept for Intelligent Vision Systems, Aug. 28, 2007, pp. 675-686.

Ochotta, et al., "Image-Based Surface Compression", In Computer Graphics Forum, vol. 27, Issue 6, Sep. 1, 2008, 15 Pages.

Park et al., "Efficient Depth Compression Based on Partial Surface for 3-D Object Represented by Layered Depth Images", In IEEE Signal Processing Letters, vol. 17, Issue 10, Oct. 1, 2010, pp. 839-842.

Sun, et al., "Rate-Distortion Optimized 3D Reconstruction from Noise-Corrupted Multi view Depth Videos", In IEEE International Conference on Multimedia and Expo, Jul. 15, 2013, pp. 1-6.

Matthies, L., M. Okutomi, A Bayesian foundation for active stereo vision, Proc. of SPIE Conf. 1198, Sensor Fusion II: Human and Machine Strategies, Nov. 1989, pp. 62-74.

Rankin, A. L., C. F. Bergh, S. B. Goldberg, P. Bellutta, A. Huertas, L. H. Matthies, Passive perception system for day/night autonomous off-road navigation, Proc. SPIE, Jun. 2, 2005, vol. 5804, Unmanned Ground Vehicle Technology VII, pp. 343-358.

Würmlin, S., E. Lamboray, M. Gross, 3D video fragments: Dynamic point samples for real-time free-viewpoint video, Computers and Graphics, Feb. 2004, vol. 28, No. 1, pp. 3-14.

Yang, Yi, U.S. Final Office Action, U.S. Appl. No. 13/566,796, Sep. 5, 2014, pp. 1-13.

Hajnik, Daniel F., U.S. Office Action, U.S. Appl. No. 13/599,170, Sep. 30, 2014, pp. 1-25.

Cain, Leon T., U.S. Office Action, U.S. Appl. No. 13/614,852, Oct. 31, 2014, pp. 1-19.

Mathis, Normal map workflow, Oct. 18, 2005, http://www.poopinmymouth.com/tutorial/normal_workflow.htm.

Yang, Yi, U.S. Office Action, U.S. Appl. No. 13/566,796, Feb. 12, 2015, pp. 1-12.

Wu, Chong, U.S. Office Action, U.S. Appl. No. 13/744,885, Feb. 12, 2015, pp. 1-19.

Joshi, Sunita, U.S. Office Action, U.S. Appl. No. 13/599,678, Apr. 1, 2015, pp. 1-32.

Hajnik, Daniel F., U.S. Final Office Action, U.S. Appl. No. 13/599,170, Jan. 27, 2015, pp. 1-29.

Abimbola, Kehinde, U.S. Office Action, U.S. Appl. No. 13/588,917, Mar. 4, 2015, pp. 1-36.

Kurutepe, E., Civanlar, M.R., Tekalp, A.M., Client-driven selective streaming of multiview video for interactive 3DTV, IEEE Transactions on Circuits and Systems for Video Technology, Nov. 2007, vol. 17, No. 11, pp. 1558-1565.

Yang, Z., Yu, B., Nahrstedt, K., Bajscy, R., A multi-stream adaptation framework for bandwidth management in 3D tele-immersion, May 2006, Proc. of the 2006 Int'l Workshop on Network and operating systems support for digital audio and video, pp. 14.

Nguyen, Phung Hoang Joseph, U.S. Office Action, U.S. Appl. No. 13/602,097, Jun. 1, 2015, pp. 1-9.

Teitelbaum, Michael E., U.S. Office Action, U.S. Appl. No. 13/566,877, Jun. 8, 2015, pp. 1-13.

Ma, Tze, U.S. Office Action, U.S. Appl. No. 13/598,536, Jun. 26, 2015, pp. 1-16.

Yang, Yi, U.S. Final Office Action, U.S. Appl. No. 13/566,796, Jun. 30, 2015, pp. 1-13.

He, Weiming, U.S. Office Action, U.S. Appl. No. 13/790,158, Apr. 28, 2015, pp. 1-27.

Cain, Leon T., U.S. Final Office Action, U.S. Appl. No. 13/614,852, Apr. 30, 2015, pp. 1-23.

Hajnik, Daniel F., U.S. Office Action, U.S. Appl. No. 13/599,170, May 18, 2015, pp. 1-25.

Petit, B., J.-D. Lesage, C. Menier, J. Allard, J.-S. Franco, B. Raffin, E. Boyer, F. Faure, Multicamra Real-Time 3D Modeling for Telepresence and Remote Collaboration, Int'l J. Of Digital Multimedia Broadcasting, 2010, vol. 2010, pp. 1-12. (the year of publication is sufficiently earlier than the effective U.S. filed and any foreign priority date so that the particular month of publication is not in issue).

Roberts, M., A work-efficient GPU algorithm for level set segmentation, High Performance Graphics, Jun. 25-27, 2010, https://vimeo.com/24167006.

Teitelbaum, Michael E., U.S. Final Office Action, U.S. Appl. No. 13/566,877, Sep. 1, 2015, pp. 1-16.

Ma, Tize, U.S. Final Office Action, U.S. Appl. No. 13/598,536, Nov. 3, 2015, pp. 1-20.

Satti, Humam M., U.S. Office Action, U.S. Appl. No. 13/598,747, Oct. 8, 2015, pp. 1-9.

Wu, Chong, U.S. Final Office Action, U.S. Appl. No. 13/744,885, Aug. 13, 2015, pp. 1-30.

He, Weiming, U.S. Final Office Action, U.S. Appl. No. 13/790,158, Aug. 13, 2015, pp. 1-31.

Cain, Leon T., U.S. Notice of Allowance, U.S. Appl. No. 13/614,852, Oct. 1, 2015, pp. 1-5.

Joshi, Sunita, U.S. Office Action, U.S. Appl. No. 13/599,678, Aug. 17, 2015, pp. 1-26.

Hajnik, Daniel F., U.S. Final Office Action, U.S. Appl. No. 13/599,170, Oct. 20, 2015, pp. 1-13.

Abimbola, Kehinde, U.S. Notice of Allowance, U.S. Appl. No. 13/588,917, Sep. 2, 2015, pp. 1-8.

* cited by examiner

GLANCING ANGLE EXCLUSION

CROSS REFERENCE TO RELATED APPLICATION

This application claims the benefit of and the priority to a prior provisional U.S. patent application entitled "INTERACTIVE SPATIAL VIDEO" which was assigned Ser. No. 61/653,983 and was filed May 31, 2012.

BACKGROUND

Free Viewpoint Video (FVV) is created from images captured by multiple cameras viewing a scene from different viewpoints. FVV generally allows a user to look at a scene from synthetic viewpoints that are created from the captured images and to navigate around the scene. In other words, in a FFV each end user can interactively generate synthetic (i.e., virtual) viewpoints of each scene on-the-fly while the video is being rendered and displayed. This creates a feeling of immersion for any end user who is viewing a rendering of the captured scene, thus enhancing their viewing experience.

The process of creating and playing back FVV or other 3D spatial video typically is as follows. First, a scene is simultaneously recorded from many different perspectives using sensors such as RGB cameras and other video and audio capture devices. Second, the captured video data is processed to extract 3D geometric information in the form of geometric proxies using 3D Reconstruction (3DR) algorithms which derive scene geometry from the input images. Three dimensional geometric proxies can include, for example, depth maps, point based renderings, or higher order geometric forms such as planes, objects, billboards, models or other high fidelity proxies such as mesh based representations. Finally, the original texture data (e.g., RGB data) and geometric proxies are recombined during rendering, for example by using Image Based Rendering (IBR) algorithms, to generate synthetic viewpoints of the scene.

Texture mapping is a method for adding detail, surface texture or color to a computer-generated 3D graphic or 3D model. Projective texturing is a method of texture mapping that allows a textured image to be projected onto a scene as if by a slide projector. For example, in FVV, the original scene image data (for example, RGB image data originally captured of the scene) can be recombined with the geometric proxies by applying the original scene images/texture data to the geometric proxies by using projective texture mapping. The geometric proxy is rendered to a virtual viewpoint and surface texture is sampled from adjacent camera images. Projective texturing uses the captured scene to create a depth map of the scene collocated with each original scene image (e.g. RGB image) which provides accurate calculations of how far objects in the scene are from a point of origin on the z-axis. A near-depth surface is closer to the point of origin on the z-axis than a far-depth surface. A depth discontinuity is defined by a jump between a near-depth surface and a far-depth surface When creating three dimensional spatial video, such as, for example, Free Viewpoint Video, errors in the geometric proxy can cause errors in projective texturing leading to artifacts that reduce the image quality. For example, if the geometric proxy does not match the silhouette boundary of an object, low depth (e.g., near depth) textures can end up on high depth (e.g., far depth) surfaces.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In general, the glancing angle exclusion technique described herein selectively limits projective texturing near depth map discontinuities when an image is being rendered and displayed. A depth discontinuity is defined by a jump between a near-depth (e.g., low depth) surface and a far-depth (e.g., high depth) surface. The claimed technique can limit projective texturing on near and far surfaces to a different degree—for example, the technique can limit far-depth projective texturing within a certain distance to a depth discontinuity but not near-depth projective texturing.

Because small errors in silhouette estimation of a geometric proxy can cause strong artifacts, one embodiment of the technique does not use projective texturing near depth discontinuities in the image or images originally captured. In one embodiment of the technique this is done by using a blend mask, where the blend mask precludes projective texturing from surfaces in the originally captured images (e.g., single or multiple intensity images, such as, for example, RGB images) close to such depth discontinuities. To identify these surfaces, the technique runs an edge detector on the depth map collocated with each input image (e.g., input RGB image). Any large depth pixels (pixels further away from the camera) that are within a variable number of pixels from an edge shared with a small depth pixel (pixels closer to the camera) are then turned off in the blend mask. When doing projective texturing, the blend mask is checked before rendering.

One embodiment of the technique stores a floating point map instead of the mask, where the value in the map is the product of a binary blend mask times the projection of the normal onto the view direction. The projection of the normal onto the view direction is used in computing a projective texturing weight, so storing the product of this value with the blend mask saves computing a dot product and checking a mask in a projective texture shader. This works on the outside of a silhouette but it also works on areas inside of the silhouette of an object such as, for example, the arm in front of a body. More specifically, this is not just a foreground background segmentation, but is also effective on any depth discontinuity.

DESCRIPTION OF THE DRAWINGS

The specific features, aspects, and advantages of the disclosure will become better understood with regard to the following description, appended claims, and accompanying drawings where:

DETAILED DESCRIPTION

In the following description of the glancing angle exclusion technique, reference is made to the accompanying drawings, which form a part thereof, and which show by way of illustration examples by which the glancing angle exclusion technique described herein may be practiced. It is to be understood that other embodiments may be utilized and structural changes may be made without departing from the scope of the claimed subject matter.

1.0 Glancing Angle Exclusion Technique

The following sections provide background information and an overview of the glancing angle exclusion technique, as well as exemplary processes and an exemplary architecture for practicing the technique. Details of various embodiments of the glancing angle exclusion technique are also provided, as is a description of a possible usage scenario.

It is also noted that for the sake of clarity specific terminology will be resorted to in describing the glancing angle exclusion technique embodiments described herein and it is not intended for these embodiments to be limited to the specific terms so chosen. Furthermore, it is to be understood that each specific term includes all its technical equivalents that operate in a broadly similar manner to achieve a similar purpose. Reference herein to "one embodiment", or "another embodiment", or an "exemplary embodiment", or an "alternate embodiment", or "one implementation", or "another implementation", or an "exemplary implementation", or an "alternate implementation" means that a particular feature, a particular structure, or particular characteristics described in connection with the embodiment or implementation can be included in at least one embodiment of the technique. The appearances of the phrases "in one embodiment", "in another embodiment", "in an exemplary embodiment", "in an alternate embodiment", "in one implementation", "in another implementation", "in an exemplary implementation", and "in an alternate implementation" in various places in the specification are not necessarily all referring to the same embodiment or implementation, nor are separate or alternative embodiments/implementations mutually exclusive of other embodiments/implementations. Yet furthermore, the order of process flow representing one or more embodiments or implementations of the technique does not inherently indicate any particular order not imply any limitations of the technique.

The term "sensor" is used herein to refer to any one of a variety of scene-sensing devices which can be used to generate a sensor data that represents a given scene. Each of the sensors can be any type of video capture device (e.g., any type of video camera).

1.2 Overview of the Technique

The glancing angle exclusion technique provides a procedure and architecture for improving projective texturing. The technique limits projective texturing near depth map discontinuities when an image is being rendered and displayed. To this end, the technique can limit projective texturing on near and far surfaces to a different degree.

The glancing angle exclusion technique seeks to avoid using projective texturing for pixels that are near depth discontinuities in an image or images originally captured. Silhouettes of a geometric proxy depend on the location of a virtual camera. However, if the virtual camera is located far from any physical camera capturing a scene, good projective texture data may be available because a silhouette seen by a virtual camera may not be a silhouette as viewed from the physical camera's perspective. Hence the technique depends on the physical camera depth discontinuities in determining when to apply projective texturing.

1.2.1 Exemplary Processes

Figure 1:
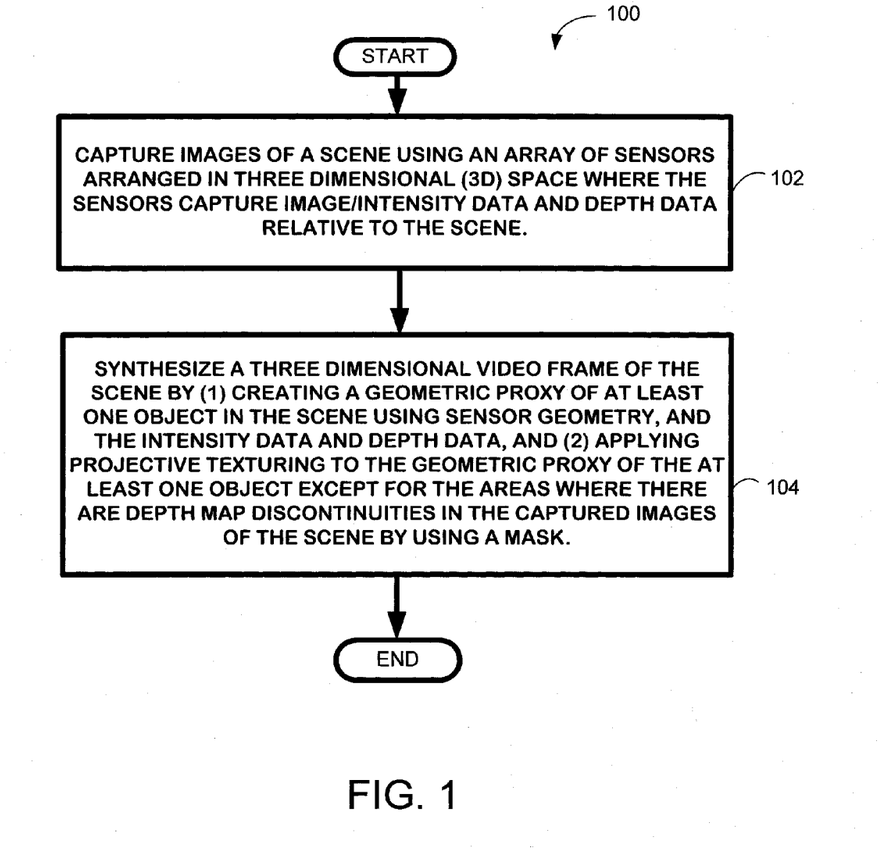
FIG. 1 depicts a flow diagram of an exemplary process of the glancing angle exclusion technique described herein.

FIG. 1 depicts one exemplary computer-implemented process 100 for performing projective texturing according to the glancing angle exclusion technique described herein. As shown in block 102, the technique captures images of a scene using an array of sensors (e.g., cameras) arranged in three dimensional (3D) space relative to the scene. The sensor (e.g., cameras) capture image/intensity data (e.g., RGB data) and depth data of the scene. Additionally, as part of the camera calibration process the technique can estimate the sensor geometry of each sensor (e.g., camera geometry of each camera) using the captured intensity data and depth data of the scene. The technique then synthesizes a three dimensional video frame of the scene, as shown in block 104. This involves creating a geometric proxy of at least one object in the scene using estimated sensor geometry and the captured image/intensity data (e.g., RGB data) and depth data, and applying projective texturing to the geometric proxy of the at least one object except for in areas where there are depth map discontinuities by using a mask.

Figure 2:
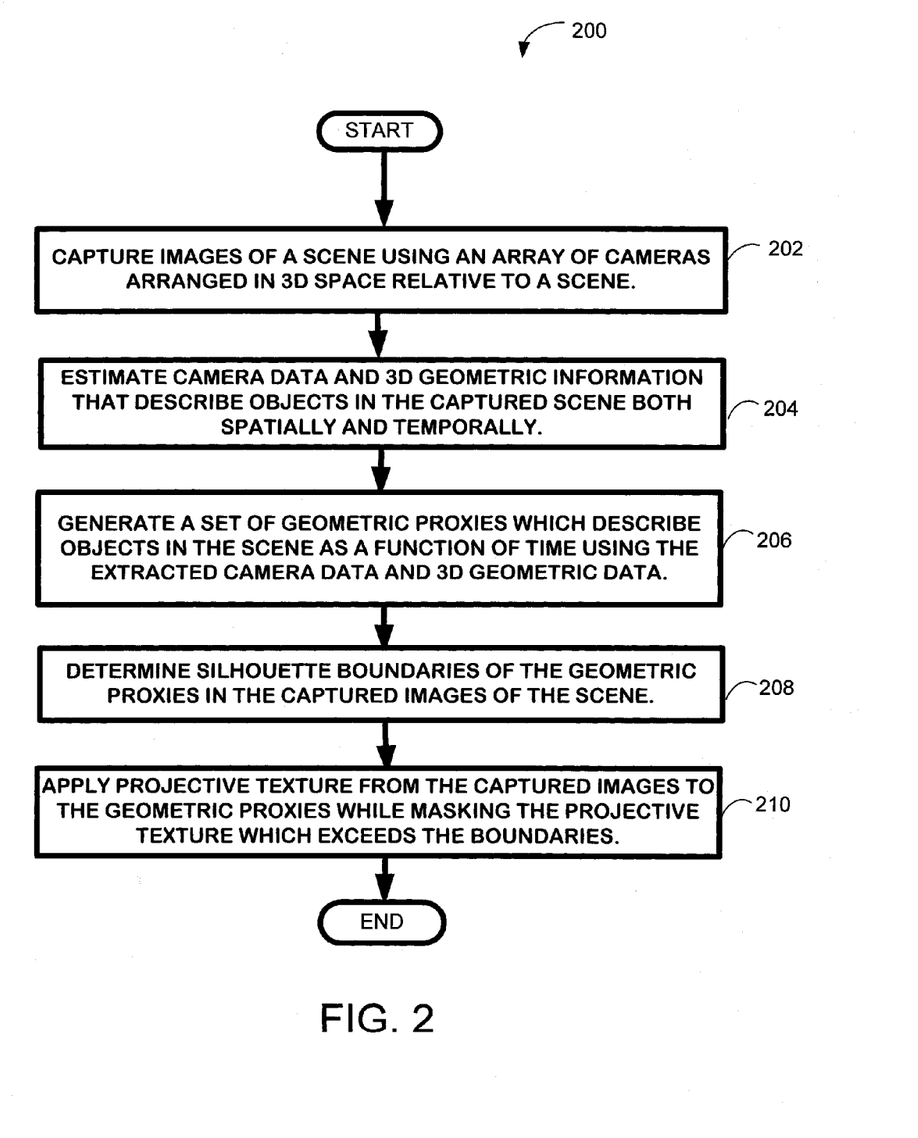
FIG. 2 depicts another flow diagram of another exemplary process of the glancing angle exclusion technique described herein.

Another exemplary process for creating synthetic video from images captured from an array of cameras using the glancing angle exclusion technique is shown in FIG. 2. As shown in block 202, images of a scene are captured using the array of cameras arranged in three dimensional (3D) space relative to a scene. Camera data and 3D geometric information that describe objects in the captured scene both spatially and temporally is then estimated, as shown in block 204. A set of geometric proxies which describe objects in the scene as a function of time is generated using the extracted sensor and 3D geometric data, as shown in block 206. Silhouette boundaries of the geometric proxies are then determined, as shown in block 208. Projective texture from the captured images is applied to the geometric proxies while masking the projective texture which exceeds the boundaries of a given silhouette, as shown in block 210.

Figure 3:
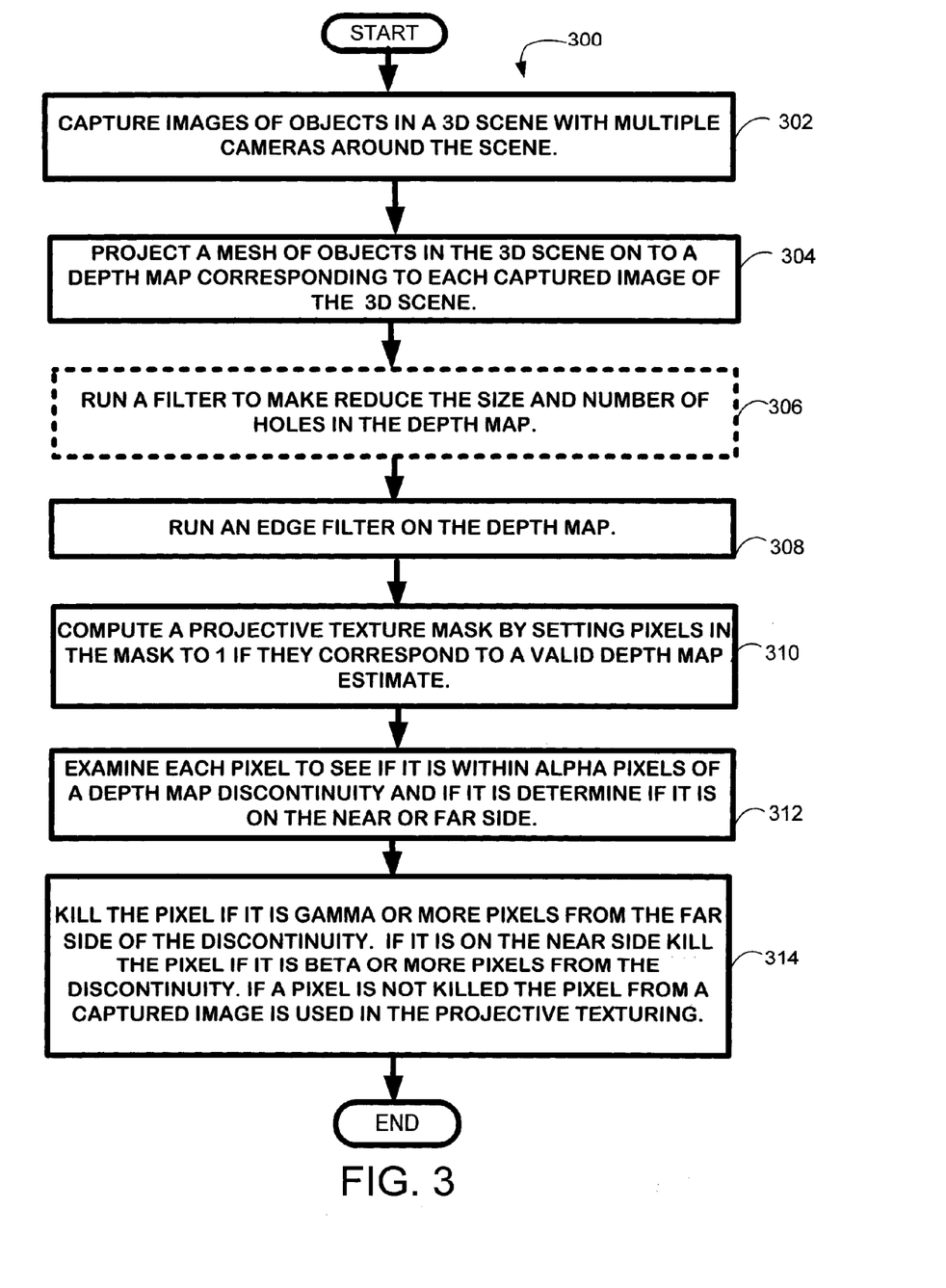
FIG. 3 depicts yet another flow diagram of another exemplary process of the glancing angle exclusion technique described herein.

A more detailed process for practicing the glancing angle exclusion technique described herein is shown in FIG. 3. To this end, as shown in block 302, images of a scene are captured using an array of cameras arranged in three dimensional (3D) space relative to a scene. A mesh of objects in the scene are projected onto a depth map corresponding to each image captured of a scene, as shown in block 304. Then, as shown in block 306, the technique can run a filter to reduce the size and number of holes in the depth map For example, the technique can run a weighted joint bilateral filter for this purpose. The step shown in block 306 is optional and primarily useful for noisy geometry. In one embodiment, the terms of the joint bilateral filter are a distance metric on color and a depth difference, and a pixel's contribution to the filter has a binary weight based on whether or not that pixel has a valid depth estimate. Bilateral filtering is an edge aware filter that smooths data but does not smooth across edge boundaries. So although the technique seeks to smooth data into holes in the depth map, it does not want to smooth across image boundaries. The technique achieves this by running a bilateral filter on the depth map using the joint depth and color term, but only pixels that have a valid depth value are used in the depth map because unknown depths cannot be used to interpolate valid depths.

Following the filtering, the technique has a complete depth map. Then as shown in block 310, an edge filter is run on the depth map (in one exemplary embodiment a basic high pass filter is used). To compute a projective texturing mask, the technique first sets pixels in the mask to 1 if they correspond to a valid depth estimate (as shown in block 312). Then, the technique examines each pixel to see if it is within alpha pixels of a depth discontinuity, as shown in block 312. If it is, the technique determines if the pixel in question is on the near or far side of the discontinuity. If it is on the near side, the technique will kill the pixel (i.e., not use the pixel from the captured image in the projective texturing) if it is beta or more pixels from the discontinuity. If it is on the far side, the technique will kill the pixel if it is gamma or more pixels from the discontinuity, as shown in block 314. If a pixel is not killed the pixel from a captured image will be used in the projective texturing. In one working implementation, alpha=5, beta is infinity (i.e., the technique does not kill near pixels), and gamma=5, where alpha, beta and gamma are prescribed or user-specified variables. Once the map is computed the projective texture is applied to objects in scene with the mask applied.

In any of the embodiments above, the glancing angle exclusion technique can store a floating point map instead of the mask, where the value in the map is the product of a binary blend mask times the projection of the normal onto the view direction. The projection of the normal onto the view direction is used in computing a projective texturing weight, so storing the product of this value with the blend mask saves computing a dot product and checking a mask in a projective texture shader.

Exemplary processes for practicing the glancing angle exclusion technique having been described, the following section discusses an exemplary architecture for practicing the technique.

1.4 Exemplary Architecture

Figure 4:
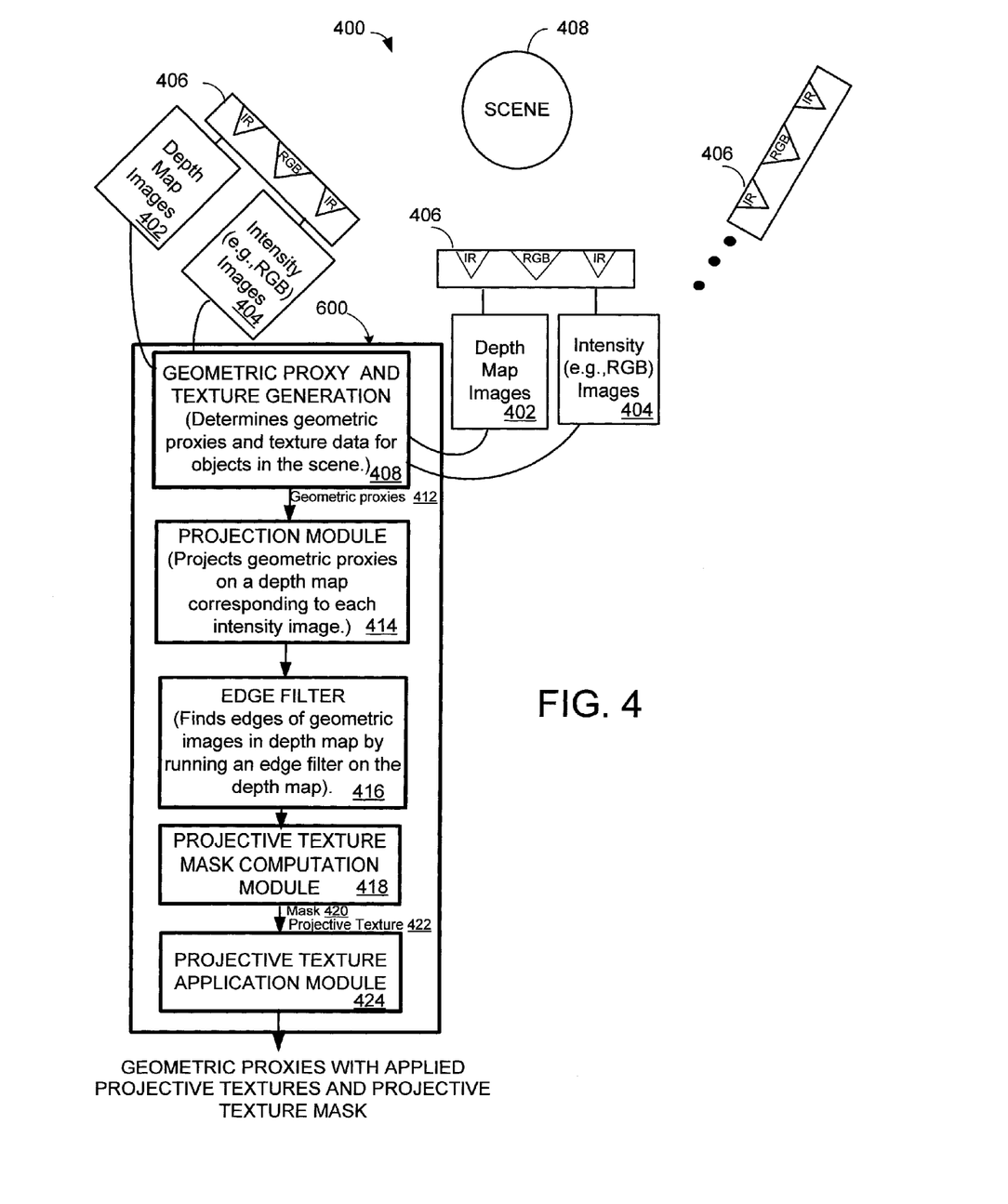
FIG. 4 is an exemplary architecture for practicing one exemplary embodiment of the glancing angle exclusion technique described herein.

FIG. 4 shows an exemplary architecture 400 for employing one embodiment of the glancing angle exclusion technique for creating a projective texture mask during three-dimensional rendering (3DR). As shown in FIG. 4, this exemplary architecture 400 inputs captured depth images 402 and corresponding intensity/RGB images 404 that were captured using an array of cameras 406 arranged in three dimensional (3D) space relative to the scene 408 into a geometric proxy and texture generating module 408 that resides on a general purpose computing device 600 which will be described in greater detail with respect to FIG. 6. The geometric proxy and texture generating module 408 generates a set of geometric proxies 412 which describe the geometric data in the scene 408, as well as generating texture data, for example, RGB data, from the originally captured intensity images. The geometric proxies 412 are projected on a depth map 402 corresponding to each intensity/RGB image 404 in a projection module 414. An edge filter 416 is run on each depth map 402 to find edges of the geometric proxies 412 in the depth map 402. A projective texture mask 420 is generated to use when applying a projective texture 422 (obtained from the original RGB images) to the geometric proxies 412 in a projective texture mask application module 424. The projective texture 422 is applied to the geometric proxies 412 while avoiding applying projective texture to the boundaries of the geometric proxies by applying the projective texture mask 420.

1.5 Exemplary Usage Scenario

The glancing angle exclusion technique can be used in various scenarios. One way the technique can be used is in a system for generating Spatial Video (SV). The following paragraphs provide details of a spatial video pipeline in which the glancing angle exclusion technique described herein can be used. The details of image capture, processing, storage and streaming, rendering and the user experience discussed with respect to this exemplary spatial video pipeline can apply to various similar processing actions discussed with respect to the exemplary processes and the exemplary architecture of the glancing angle exclusion technique discussed above. The glancing angle exclusion technique is typically performed as part of the rendering process of the pipeline.

Spatial Video (SV) provides a next generation, interactive, and immersive video experiences relevant to both consumer entertainment and telepresence, leveraging applied technologies from Free Viewpoint Video (FVV). As such, SV encompasses a commercially viable system that supports features required for capturing, processing, distributing, and viewing any type of FVV media in a number of different product configurations.

It is noted, however, that glancing angle exclusion technique embodiments described herein are not limited to only the exemplary FVV pipeline to be described. Rather, other FFV pipelines and other system configurations can also be employed to create and render video using the glancing angle exclusion technique, as desired.

1.5.1 Spatial Video Pipeline

Figure 5:
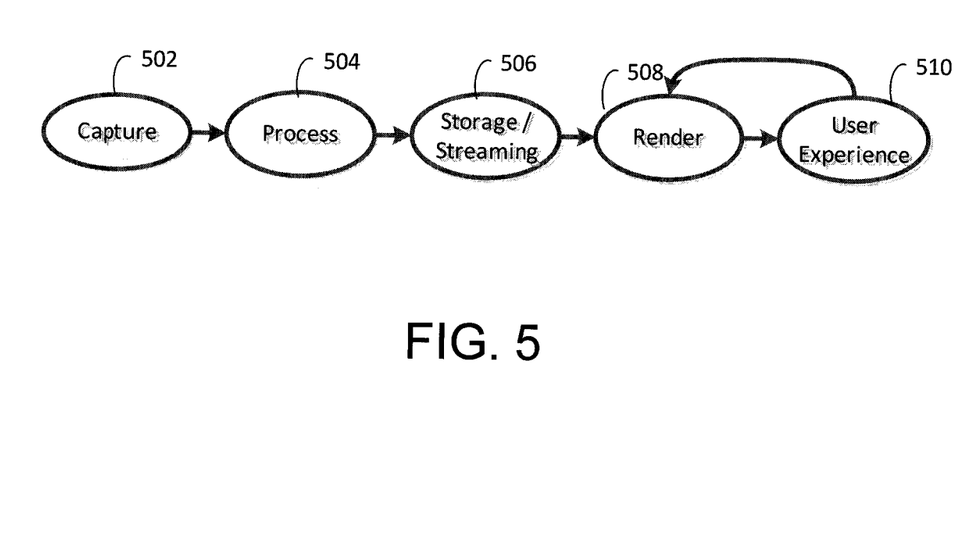
FIG. 5 depicts an exemplary spatial video pipeline in which the glancing angle exclusion technique can be practiced.

SV employs an end to end processing and playback pipeline for any type of FVV that can be captured. Such a pipeline 500 is shown in FIG. 5, the primary components of which include: Capture 502; Process 504; Storage/Streaming 506; Render 508; and the User Experience 510.

The SV Capture 502 stage of the pipeline supports any hardware used in an array to record a FVV scene. This includes the use of various different kinds of sensors (including video cameras and audio) for recording data. When sensors are arranged in 3D space relative to a scene, their type, position, and orientation is referred to as the camera geometry. The SV pipeline generates the calibrated camera geometry for static arrays of sensors as well as for moving sensors at every point in time during the capture of a FVV. The SV pipeline is designed to work with any type of sensor data from any kind of an array, including, but not limited to RGB data from traditional cameras (including the use of structured light such a with Microsoft® Corporation's Kinect™), monochromatic cameras, or time of flight (TOF) sensors that generate depth maps and RGB data directly. The SV pipeline is able to determine the intrinsic and extrinsic characteristics of any sensor in the array at any point in time. Intrinsic parameters such as the focal length, principal point, skew coefficient, and distortions are required to understand the governing physics and optics of a given sensor. Extrinsic parameters include both rotations and translations which detail the spatial location of the sensor as well as the direction the sensor is pointing. Typically, a calibration setup procedure is carried out that is specific to the type, number and placement of sensors. This data is often recorded in one or more calibration procedures prior to recording a specific FVV. If so, this data is imported into the SV pipeline in addition to any data recorded with the sensor array.

Variability associated with the FVV scene as well as playback navigation may impact how many sensors are used to record the scene as well as which type of sensors are selected and their positioning. SV typically includes at minimum one RGB sensor as well as one or more sensors that can be used in combination to generate 3D geometry describing a scene. Outdoor and long distance recording favors both wide baseline and narrow baseline RGB stereo sensor pairs. Indoor conditions favor narrow baseline stereo IR using structured light avoiding the dependency upon lighting variables. As the scene becomes more complex, for example as additional people are added, the use of additional sensors reduces the number of occluded areas within the scene—more complex scenes require better sensor coverage. Moreover, it is possible to capture both an entire scene at one sensor density and then to capture a secondary, higher resolution volume at the same time, with additional moveable sensors targeting the secondary higher resolution area of the scene. As more sensors are used to reduce occlusion artifacts in the array, additional combinations of the sensors can also be used in processing such as when a specific sensor is part of both a narrow baseline stereo pair as well as a different wide baseline stereo pair involving a third sensor.

The SV pipeline is designed to support any combination of sensors in any combination of positions.

The SV Process 504 stage of the pipeline takes sensor data and extracts 3D geometric information that describes the recorded scene both spatially and temporally. Different types of 3DR algorithms can be used depending on: the number and type of sensors, the input camera geometry, and whether processing is done in real time or asynchronously from the playback process. The output of the process stage is various geometric proxies which describe the scene as a function of time. Unlike video games or special effects technology, 3D geometry in the SV pipeline is created using automated computer vision 3DR algorithms with no human input required.

SV Storage and Streaming 506 methods are specific to different FVV product configurations, and these can be segmented as: bidirectional live applications of FVV in telepresence, broadcast live applications of FVV, and asynchronous applications of FVV. Depending on details associated with these various product configurations, data is processed, stored, and distributed to end users in different manners.

The SV pipeline uses 3D reconstruction to process calibrated sensor data to create geometric proxies describing the FVV scene. The SV pipeline uses various 3D reconstruction approaches depending upon the type of sensors used to record the scene, the number of sensors, the positioning of the sensors relative to the scene, and how rapidly the scene needs to be reconstructed. 3D geometric proxies generated in this stage includes depth maps, point based renderings, or higher order geometric forms such as planes, objects, billboards, models, or other high fidelity proxies such as mesh based representations.

The SV Render 508 stage is based on image based rendering (IBR), since synthetic, or virtual, viewpoints of the scene are created using real images and different types of 3D geometry. SV render 508 can use different IBR algorithms to render synthetic viewpoints based on variables associated with the product configuration, hardware platform, scene complexity, end user experience, input camera geometry, and the desired degree of viewpoint navigation in the final FVV. Therefore, different IBR algorithms are used in the SV Rendering stage to maximize photorealism from any necessary synthetic viewpoints during end user playback of a FVV.

When the SV pipeline is used in real time applications, sensor data must be captured, processed, transmitted, and rendered in less than one thirtieth of a second. Because of this constraint, the types of 3D reconstruction algorithms that can be used are limited to high performance algorithms. Primarily, 3D reconstruction that is used real time includes point cloud based depictions of a scene or simplified proxies such as billboards or prior models which are either modified or animated. The use of active IR or structured light can assist in generating point clouds in real time since the pattern is known ahead of time. Algorithms that can be implemented in hardware are also favored.

Asynchronous 3D reconstruction removes the constraint of time from processing a FVV. This means that point based reconstructions of the scene can be used to generate higher fidelity geometric proxies, such as when point clouds are used as an input to create a geometric mesh describing surface geometry. The SV pipeline also allows multiple 3D reconstruction steps to be used when creating the most accurate geometric proxies describing the scene. For example, if a point cloud representation of the scene has been reconstructed, there may be some noisy or error prone stereo matches present that extend the boundary of the human silhouette, leading to the wrong textures appearing on a mesh surface. To remove these artifacts, the SV pipeline runs a segmentation process to separate the foreground from the background, so that points outside of the silhouette are rejected as outliers.

In another example of 3D reconstruction, a FVV is created with eight genlocked devices from a circular camera geometry each device consisting of: 1 IR randomized structured light projector, 2 IR cameras, and 1 RGB camera. Firstly, IR images are used to generate a depth map. Multiple depth maps and RGB images from different devices are used to create a 3D point cloud. Multiple point clouds are combined and meshed. Finally, RGB image data is mapped to the geometric mesh in the final result, using a view dependent texture mapping approach which accurately represents specular textures such as skin.

The SV User Experience 510 processes data so that navigation is possible with up to 6 degrees of freedom (DOE) during FVV playback. In non-live applications, temporal navigation is possible as well—this is spatiotemporal (or space-time) navigation. Viewpoint navigation means users can change their viewpoint (what is seen on a display interface) in real time, relative to moving video. In this way, the video viewpoint can be continuously controlled or updated during playback of a FVV scene.

Figure 6:
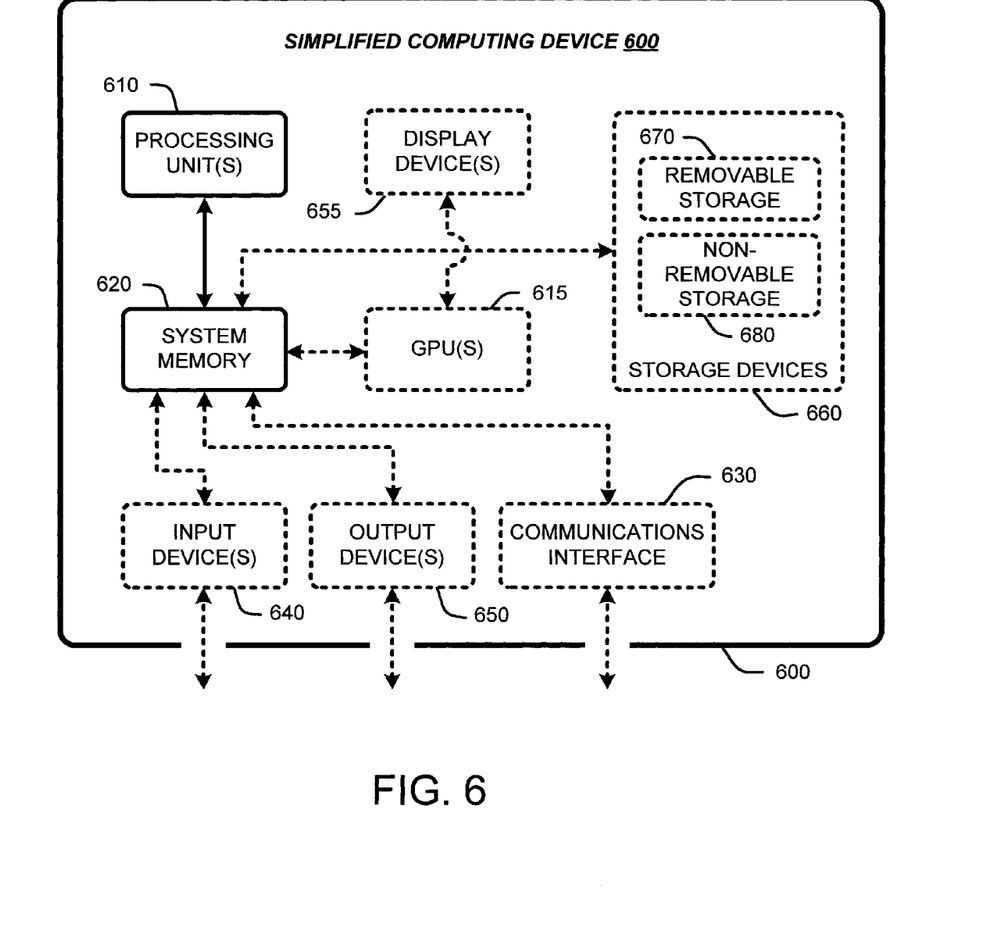
FIG. 6 is a schematic of an exemplary computing environment which can be used to practice the glancing angle exclusion technique.

2.0 Exemplary Operating Environments:

The glancing angle exclusion technique described herein is operational within numerous types of general purpose or special purpose computing system environments or configurations. FIG. 6 illustrates a simplified example of a general-purpose computer system on which various embodiments and elements of the glancing angle exclusion technique, as described herein, may be implemented. It should be noted that any boxes that are represented by broken or dashed lines in FIG. 6 represent alternate embodiments of the simplified computing device, and that any or all of these alternate embodiments, as described below, may be used in combination with other alternate embodiments that are described throughout this document.

For example, FIG. 6 shows a general system diagram showing a simplified computing device 600. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the glancing angle exclusion technique, the device should have a sufficient computational capability and system memory to enable basic computational operations. In particular, as illustrated by FIG. 6, the computational capability is generally illustrated by one or more processing unit(s) 610, and may also include one or more GPUs 615, either or both in communication with system memory 620. Note that that the processing unit(s) 610 of the general computing device may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 6 may also include other components, such as, for example, a communications interface 630. The simplified computing device of FIG. 6 may also include one or more conventional computer input devices 640 (e.g., pointing devices, keyboards, audio input devices, video input devices, haptic input devices, devices for receiving wired or wireless data transmissions, etc.). The simplified computing device of FIG. 6 may also include other optional components, such as, for example, one or more conventional computer output devices 650 (e.g., display device(s) 655, audio output devices, video output devices, devices for transmitting wired or wireless data transmissions, etc.). Note that typical communications interfaces 630, input devices 640, output devices 650, and storage devices 660 for general-purpose computers are well known to those skilled in the art, and will not be described in detail herein.

The simplified computing device of FIG. 6 may also include a variety of computer readable media. Computer readable media can be any available media that can be accessed by computer 600 via storage devices 660 and includes both volatile and nonvolatile media that is either removable 670 and/or non-removable 580, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the glancing angle exclusion technique described herein, or portions thereof, may be stored, received, transmitted, or read from any desired combination of computer or machine readable media or storage devices and communication media in the form of computer executable instructions or other data structures.

Finally, the glancing angle exclusion technique described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

What is claimed is:

1. A computer-implemented process for creating a synthetic video from images captured from an array of cameras, comprising the process actions of:
   (a) capturing images of a scene using the array of cameras arranged in three dimensional (3D) space relative to the scene;
   (b) estimating camera data and 3D geometric information that describes objects in the captured scene both spatially and temporally;
   (c) generating a set of geometric proxies which describe objects in the scene as a function of time using the extracted camera and 3D geometric data
   (d) determining silhouette boundaries of the geometric proxies in the captured images of the scene;
   (e) applying projective texture from the captured images to the geometric proxies while masking the projective texture which exceeds the boundaries of the silhouette by using depth map discontinuities comprising:
      for each pixel of the projective texture within a first number of pixels from a depth map discontinuity, determining if the pixel is on the near side or the far side of the discontinuity,
      if the pixel is on the near side, not using the pixel for rendering if the pixel is within a second number of pixels from the discontinuity, and
      if the pixel is on the far side, not using the pixel for rendering if the pixel is within a third number of pixels from the discontinuity.

2. The computer-implemented process of claim 1 wherein the silhouette boundaries are determined by using an edge detector on a depth map associated with each captured image of the object.

3. The computer-implemented process of claim 1 wherein the projective texture is masked by a blend mask.

4. The computer-implemented process of claim 3 wherein any large depth pixels that are within a variable number of pixels from an edge shared with a small depth pixel are turned off in the blend mask.

5. The computer-implemented process of claim 3 wherein the blend mask is checked before an object is rendered.

6. The computer-implemented process of claim 1, wherein the projective texture is masked using a floating point map.

7. The computer-implemented process of claim 6, wherein the floating point map is a product of a blend mask times the projection of a normal onto a given view direction used in computing a projective texturing weight.

8. The computer-implemented process of claim 1, wherein a weighted joint bilateral filter is used to reduce the number and size of holes in the depth map.

9. The computer-implemented process of claim 1 wherein the geometric proxies are generated using 3D rendering algorithms.

10. A computer-implemented process for generating a 3D spatial video, comprising:
   capturing images of a scene using an array of sensors arranged in three dimensional (3D) space relative to the scene, wherein the sensors capture intensity data and depth data of the scene;
   synthesizing a three dimensional video frame of the scene comprising:
      creating a geometric proxy of at least one object in the scene using estimated sensor geometry and the intensity data and depth data;
      applying projective texturing to the geometric proxy of the at least one object by using one or more depth map discontinuities comprising examining pixels of texture data within a first prescribed number of pixels from a depth map discontinuity, and not using pixels within a second prescribed number of pixels from a near side of the discontinuity and a third prescribed number of pixels from a far side of the discontinuity for applying the projective texturing.

11. The computer-implemented process of claim 10 wherein a depth map discontinuity further comprises a jump between a near-depth surface and a far-depth surface.

12. The computer-implemented process of claim 10 wherein projective texturing can be applied to near depth surfaces and far depth surfaces to a different degree.

13. The computer-implemented process of claim 12 wherein projective texturing of a far depth surface can be not rendered within a certain distance to a depth discontinuity.

14. The computer-implemented process of claim 10, wherein a weighted joint bilateral filter is used to reduce the size and number of holes in the depth map.

15. A system for generating a 3D spatial video, comprising:
   a computing device;
   a computer program comprising program modules executable by the general purpose computing device, wherein the computing device is directed by the program modules of the computer program to,
      (a) input captured depth images and corresponding RGB images of a scene that were captured using an array of cameras arranged in three dimensional (3D) space relative to the scene;
      (b) generating a set of geometric proxies which describe objects in the scene;
      (c) projecting the geometric proxies onto a depth map corresponding to each RGB image;
      (d) running an edge filter on the depth map to find edges of the geometric proxies in the depth map;
      (e) computing a projective texture mask to use when applying a projective texture to the geometric proxies by locating depth map discontinuities and determining a distance in pixels from the discontinuities as the edges of the mask, wherein in the mask any large depth pixels of the projective texture that are within a variable number of pixels from an edge shared with a small depth pixel are not used when applying the projective textures to the geometric proxies;
      (f) applying projective texture to the geometric proxies while avoiding applying projective texture to the boundaries of the geometric proxies by using the projective texture mask.

16. The system of claim 15 wherein the edge filter is a high pass filter.

17. The system of claim 15 wherein the projective texture mask is determined by:
   setting the pixels in the mask to 1 if the pixel correspond to a valid depth estimate;
   examining each pixel to see if it is within alpha pixels of a depth discontinuity;
   if the pixel is within alpha pixels a depth discontinuity, determining if the pixel is on the near side or the far side of the depth discontinuity, where alpha is a prescribed value;
   if the pixel is on the near side, not using the pixel for rendering if the pixel is beta or more pixels from the discontinuity, where beta is a prescribed value;
   if the pixel is on the far side, not using the pixel for rendering if the pixel is gamma or more pixels from the discontinuity, where gamma is a prescribed value.

18. The system of claim 17 wherein alpha=5, beta is infinity and gamma=5.

19. The system of claim 17 wherein alpha, beta and gamma are user-defined variables.

20. The system of claim 16 wherein the projective texture mask is a blend mask and wherein any large depth pixels that are within a variable number of pixels from an edge shared with a small depth pixel are turned off in the blend mask.

* * * * *